United States Patent
Fume

(10) Patent No.: US 11,429,786 B2
(45) Date of Patent: Aug. 30, 2022

(54) DOCUMENT ANALYSIS DEVICE, LEARNING DEVICE, DOCUMENT ANALYSIS METHOD, AND LEARNING METHOD

(71) Applicant: KABUSHIKI KAISHA TOSHIBA, Minato-ku (JP)

(72) Inventor: Kosei Fume, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 396 days.

(21) Appl. No.: 16/801,326

(22) Filed: Feb. 26, 2020

(65) Prior Publication Data

US 2020/0356723 A1 Nov. 12, 2020

(30) Foreign Application Priority Data

May 7, 2019 (JP) .............................. JP2019-087651

(51) Int. Cl.
*G06F 40/268* (2020.01)
*G06N 3/08* (2006.01)
(Continued)

(52) U.S. Cl.
CPC ......... *G06F 40/268* (2020.01); *G06K 9/6221* (2013.01); *G06N 3/08* (2013.01); *G06V 10/454* (2022.01); *G06V 30/413* (2022.01)

(58) Field of Classification Search
CPC .. G06F 40/268; G06V 30/413; G06V 10/454; G06K 9/6221; G06N 3/08
See application file for complete search history.

(56) References Cited

U.S. PATENT DOCUMENTS

2015/0199567 A1 7/2015 Fume et al.
2018/0005082 A1* 1/2018 Bluche ................. G06N 3/0445
(Continued)

FOREIGN PATENT DOCUMENTS

JP 2014-67154 A 4/2014
JP 2016-27493 A 2/2016

OTHER PUBLICATIONS

Isonuma, M. et al., "Extractive Summarization using Multi-Task Learning with Document Classification," The 31st Annual Conference of the Japanese Society for Artificial Intelligence, 2017, (with English translation), 12 pages.
(Continued)

*Primary Examiner* — Fayyaz Alam
(74) *Attorney, Agent, or Firm* — Oblon, McClelland, Maier & Neustadt, L.L.P.

(57) ABSTRACT

According to an embodiment, a document analysis device includes one or more hardware processors configured to function as a sentence extraction unit, an analysis unit, a neural network unit. The analysis unit generates, for each of sentences, initial element information representing an initial value of relevance to each of predetermined attribute items. The neural network unit receives sentence information and outputs execution result of a main task on the target document, for each of the sentences. The neural network unit includes an attention unit and a main task execution. The attention receives the sentence information and the initial element information, calculates an attention weight and outputs attention information according to the attention weight, for each of the sentences. The main task execution unit executes the main task based on the attention information for each of the sentences.

13 Claims, 14 Drawing Sheets

(51) Int. Cl.
*G06K 9/62* (2022.01)
*G06V 10/44* (2022.01)
*G06V 30/413* (2022.01)

(56) References Cited

U.S. PATENT DOCUMENTS

| | | | |
|---|---|---|---|
| 2019/0385253 A1* | 12/2019 | Vacek | G06N 3/0445 |
| 2020/0073937 A1* | 3/2020 | Zhao | G06N 3/08 |
| 2020/0210526 A1* | 7/2020 | Leibovitz | G06N 3/08 |
| 2020/0320289 A1* | 10/2020 | Su | G06K 9/6271 |
| 2020/0334416 A1* | 10/2020 | Vianu | G06V 30/153 |
| 2020/0356729 A1* | 11/2020 | Duan | G06N 3/0445 |
| 2021/0081717 A1* | 3/2021 | Creed | G06N 5/022 |
| 2021/0117815 A1* | 4/2021 | Creed | G06F 17/16 |

OTHER PUBLICATIONS

Kondo, H., "Classifying patent document and Suggestion grounds for assigning the patent classification," Japio—year book, 2018, (with English translation), 15 pages.

Vaswani, A. et al., "Attention Is All You Need," 31$^{st}$ Conference on Neural Information Processing Systems, (NIPS 2017), 2017, arXiv:1706. 03762v5 [cs.CL], Dec. 6, 2017, pp. 1-15.

\* cited by examiner

DOCUMENT ANALYSIS DEVICE, LEARNING DEVICE, DOCUMENT ANALYSIS METHOD, AND LEARNING METHOD

CROSS-REFERENCE TO RELATED APPLICATIONS

This application is based upon and claims the benefit of priority from Japanese Patent Application No. 2019-087651, filed on May 7, 2019; the entire contents of which are incorporated herein by reference.

FIELD

Embodiments described herein relate generally to a document analysis device, a learning device, a document analysis method, and a learning method.

BACKGROUND

Document analysis devices using neural networks are known. In recent years, neural networks including attention are widely used in the field of natural language processing.

There are documents similar to each other in the content written, but are different from each other in format or structure. For example, a report describing a result of an action to a failure of a device used by a client, a document describing a result of client questionnaire, and a memo describing content of a trouble that is occurred in the company are similar to each other in the content but are different from each other in format and structure. Preferably, a document analysis device using a neural network can analyze such documents of various formats and structures with high accuracy.

DETAILED DESCRIPTION

According to an embodiment, a document analysis device includes one or more hardware processors configured to function as a sentence extraction unit, an analysis unit, a neural network unit. The sentence extraction unit is configured to extract a plurality of sentences in a target document. The analysis unit is configured to generate, for each of the plurality of sentences, initial element information representing an initial value of relevance to each of a plurality of predetermined attribute items. The neural network unit is configured to receive sentence information representing content of an included text and the initial element information, and output a result of executing a main task on the target document, for each of the plurality of sentences. The neural network unit includes an attention unit and a main task execution. The attention unit is configured to receive the sentence information and the initial element information, calculate an attention weight representing an estimated value of relevance to each of the plurality of attribute items, and output attention information according to the attention weight, for each of the plurality of sentences. The main task execution unit is configured to execute the main task based on the attention information for each of the plurality of sentences. Hereinafter, an information processing system 10 according to an embodiment will be described with reference to the drawings.

First Embodiment

Figure 1:
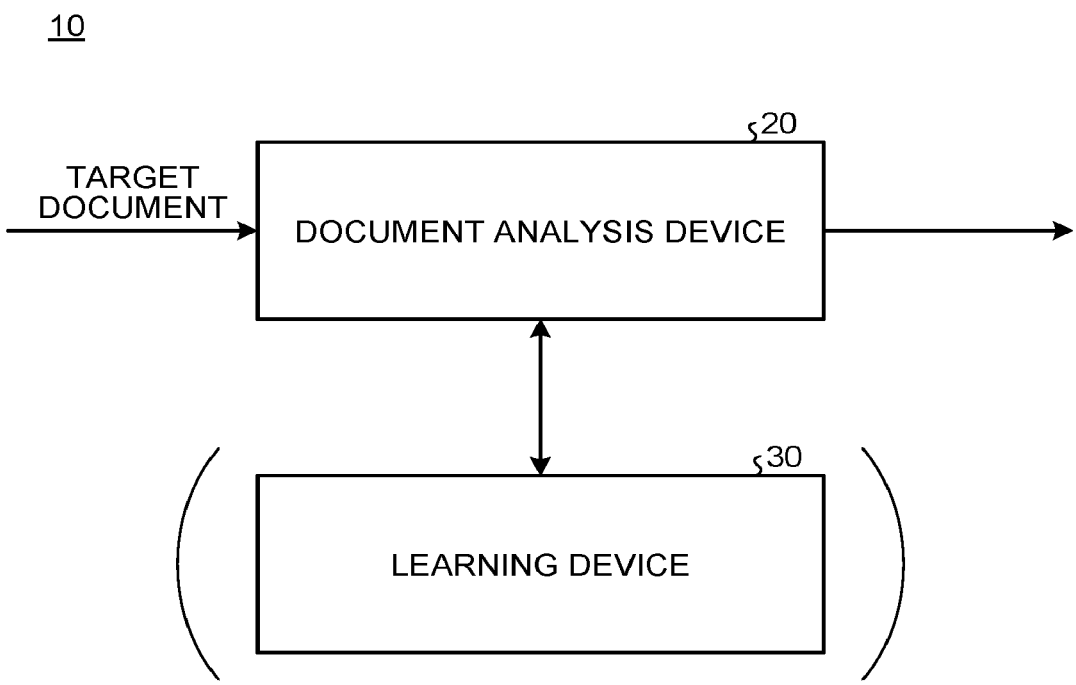
FIG. 1 is a diagram illustrating a configuration of an information processing system.

FIG. 1 is a diagram illustrating a configuration of an information processing system 10 according to a first embodiment. The information processing system 10 includes a document analysis device 20 and a learning device 30.

The document analysis device 20 receives a target document, analyzes the received target document using a neural network, and outputs an analysis result. The document analysis device 20 may perform any kind of analysis. For example, the document analysis device 20 outputs a category by classifying the target document. For example, the document analysis device 20 outputs an important part of the target document. Furthermore, for example, the document analysis device 20 outputs a new document by converting the format of the target document.

The learning device 30 trains the neural network included in the document analysis device 20 to make the document analysis device 20 output the analysis result with high accuracy. Note that the information processing system 10 may include the learning device 30 at the time of learning. In other words, the information processing system 10 may not include the learning device 30 at the time of analysis.

Figure 2:
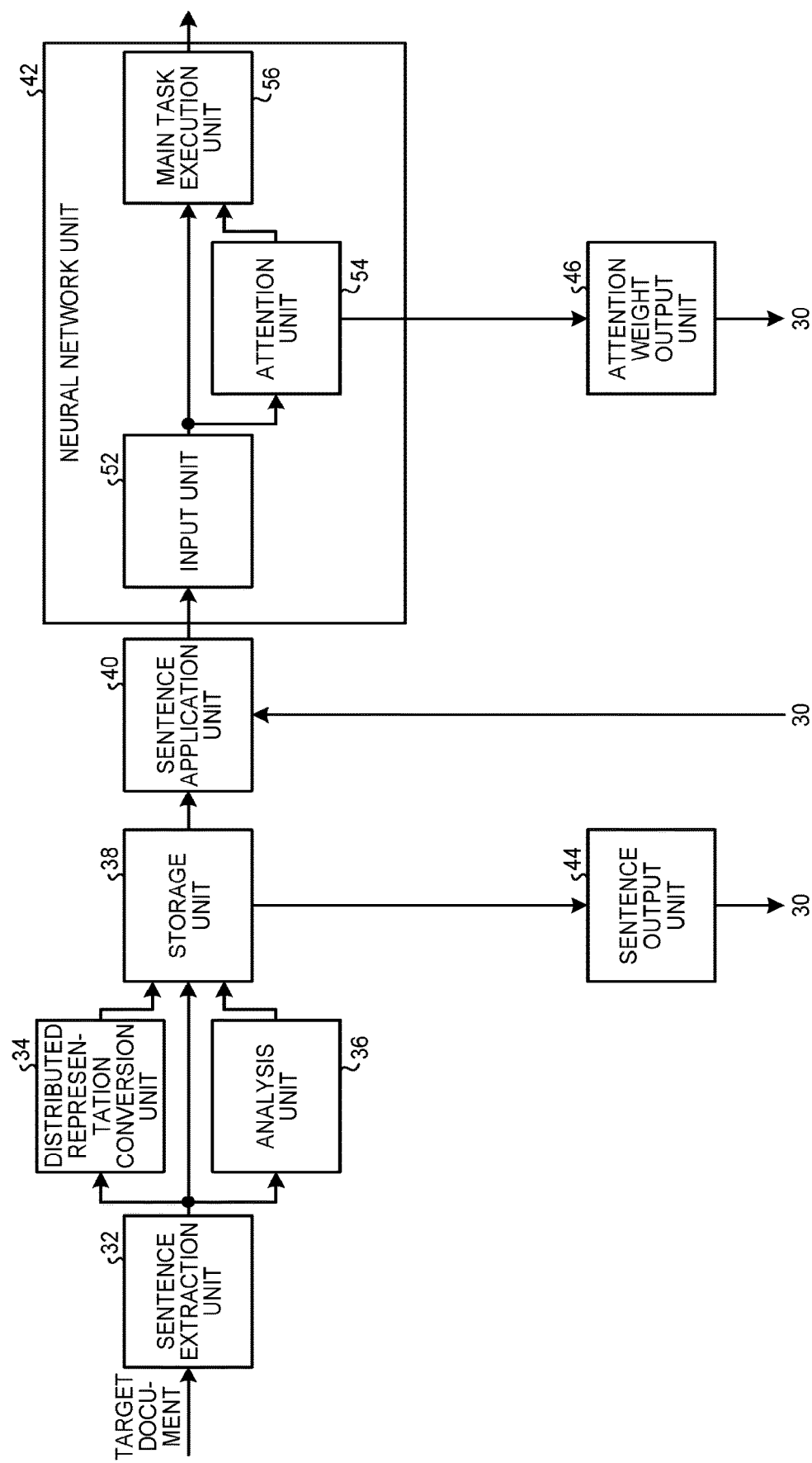
FIG. 2 is a diagram illustrating a configuration of a document analysis device according to a first embodiment.

FIG. 2 is a diagram illustrating a configuration of the document analysis device 20 according to the first embodiment. The document analysis device 20 includes a sentence extraction unit 32, a distributed representation conversion unit 34, an analysis unit 36, a storage unit 38, a sentence application unit 40, a neural network unit 42, a sentence output unit 44, and an attention weight output unit 46.

The sentence extraction unit 32 acquires a target document to be analyzed. The target document is data in a document format.

The sentence extraction unit 32 extracts a plurality of sentences included in the target document. Each of the plurality of sentences is information including text data. For example, the sentence extraction unit 32 extracts a plurality of sentences by dividing text data included in the target document according to a predetermined rule. For example, the sentence extraction unit 32 extracts a plurality of sentences by dividing text data included in the target document on a sentence-by-sentence basis. The sentence extraction unit 32 may divide the text data included in the target document on a line-by-line basis, on a paragraph-by-paragraph basis, at each predetermined mark, or with a combination of these.

The distributed representation conversion unit 34 generates sentence information representing the content of the included text for each of the plurality of sentences extracted by the sentence extraction unit 32. For example, the distributed representation conversion unit 34 performs morphological analysis on the included text data for each of the plurality of sentences. Thus, the distributed representation conversion unit 34 can extract one or a plurality of morphemes for each of the plurality of sentences. Next, the distributed representation conversion unit 34 converts each of the one or more morphemes thus extracted into a distributed representation. Then, for each of the plurality of sentences, the distributed representation conversion unit 34 outputs one or a plurality of distributed representations as sentence information.

The analysis unit 36 generates initial element information for each of the plurality of sentences extracted by the sentence extraction unit 32. The initial element information represents an initial value of the relevance (i.e., a degree of relevance) of sentences to each of a plurality of predetermined attribute items. The relevance may be represented by a numerical value, for example. The relevance is a value that is higher for a sentence more related to the attribute item and is lower for a sentence less related to the attribute item. For example, the relevance of a sentence related to the attribute item may be 1 and the relevance of a sentence not related to the attribute item may be 0. The relevance may further be a numerical value between 1 and 0 both inclusive. The relevance may be expressed as a percentage. The initial element information is vector information of a predetermined dimension storing such a relevance for each of a plurality of attribute items.

The attribute item is an item representing the role of the sentence in the document, the structure of an area including the sentence in the document, character decoration included in the sentence, and the like.

Any one of a plurality of predetermined attribute items represents, for example, a role of the sentence in a document. More specifically, the role of a sentence in a document is, for example, title, author and drafter, date, table of contents, chapter and section heading, chart description, citation, or footnotes and remarks. For example, if the sentence is the title of the document, the initial element information has the relevance set to be 1 for the attribute item corresponding to the title, and set to be 0 for the respective attribute items corresponding to author and drafter, date, table of contents, chapter and section heading, chart description, citation, and footnotes and remarks.

In addition, any one of the plurality of predetermined attribute items represents, for example, a structure of an area including the sentence, in a document. The structure of the area including the sentence in the document is, for example, itemization symbol, numbered list, unnumbered list, or indent.

For example, when the sentence includes an itemization symbol, the initial element information has the relevance set to be 1 for the attribute item corresponding to an itemization symbol. For example, if the sentence includes no itemization symbol, the initial element information has the relevance set to be 0 for the attribute item corresponding to itemization symbol. The itemization symbol is a symbol indicating that the text is described in bullets.

For example, when the sentence is included in a numbered list, the initial element information has the relevance set to be 1 for the attribute item corresponding to numbered list. For example, when the sentence is not included in the numbered list, the initial element information has the relevance set to be 0 for the attribute item corresponding to numbered list.

For example, when an indent is set for a paragraph including the sentence, the initial element information has a relevance set to be 1 for the attribute item corresponding to indent. For example, when the indent is not set for the paragraph including the sentence, the initial element information has the relevance set to be 0 for the attribute item corresponding to the indent.

In addition, any one of a plurality of predetermined attribute items represents, for example, the character decoration included in the sentence. For example, the character decoration corresponds to a character of a predetermined special font or a character of a predetermined special size.

For example, when the sentence includes a special font character, the initial element information has the relevance to be 1 for the attribute item corresponding to special font. For example, when the sentence includes a special size character, the initial element information has the relevance set to be 1 for the attribute item corresponding to special size.

The analysis unit 36 determines an initial value of the relevance for each of the plurality of attribute items corresponding to a sentence provided thereto, based on a preset rule. For example, for each of the plurality of attribute items, a predetermined arithmetic expression or determination program for determining whether the provided sentence is related to the attribute item is set in the analysis unit 36. Then, the analysis unit 36 inputs the provided sentence (and sentences around the provided sentence) to the arithmetic expression or the determination program corresponding to each of the plurality of attribute items, and calculates the initial value of the relevance for the corresponding attribute item.

The analysis unit 36 outputs the initial element information thus calculated, for each of a plurality of sentences.

The storage unit 38 stores the text data, the sentence information, and the initial element information in association with each of a plurality of sentences extracted by the sentence extraction unit 32. For each of a plurality of sentences, the storage unit 38 may further store order information indicating an order of the sentence in the document. The order information includes the number of the page, the number of the paragraph, the number of the line, and the like including the corresponding sentence.

The sentence application unit 40 sequentially selects a sentence one by one from a plurality of sentences stored in the storage unit 38. For example, the sentence application unit 40 selects one sentence at a time from the beginning of the target document.

Then, the sentence application unit 40 provides to the neural network unit 42, the initial element information and the sentence information corresponding to the selected sentence. Furthermore, the sentence application unit 40 may also provide to the neural network unit 42, the order information corresponding to the selected sentence.

The neural network unit 42 receives the sentence information and the initial element information for each of a plurality of sentences included in the target document. For each of the plurality of sentences, the neural network unit 42 may further receive the order information indicating the order of the sentence in the document. For each of the plurality of sentences, the neural network unit 42 receives these pieces of information for one sentence at a time from the beginning of the target document.

Then, the neural network unit 42 outputs an execution result of executing a main task on the target document. For example, the neural network unit 42 outputs the category of the target document. For example, the neural network unit 42 outputs an important part of the target document. For example, the neural network unit 42 outputs a new document obtained by converting the format of the target document.

The neural network unit 42 includes an input unit 52, an attention unit 54, and a main task execution unit 56.

The input unit 52 receives the sentence information and the initial element information for each of the plurality of sentences. The input unit 52 may further receive the order information for each of the plurality of sentences. Note that for each of the plurality of sentences, the input unit 52 receives these pieces of information for one sentence at a time from the beginning of the target document.

The input unit 52 provides the sentence information and the initial element information received, to the attention unit 54. The input unit 52 may also provide the order information received, to the attention unit 54.

Furthermore, the input unit 52 provides the sentence information received, to the main task execution unit 56. The input unit 52 may also provide the order information received, to the main task execution unit 56.

The input unit 52 may be implemented by a single layer or by a plurality of layers. The input unit 52 implemented with a plurality of layers executes predetermined processing on the sentence information, the initial element information, and the order information received, and provides the resultant information to the attention unit 54 and the main task execution unit 56.

The attention unit 54 is a neural network including a plurality of layers. The attention unit 54 receives the sentence information and the initial element information for each of the plurality of sentences. The attention unit 54 may also receive the corresponding order information.

The attention unit 54 calculates an attention weight based on the information received for each of the plurality of sentences. The attention weight represents an estimated value of the relevance for each of the plurality of attribute items. Then, for each of the plurality of sentences, the attention unit 54 outputs attention information according to the calculated attention weight, to the main task execution unit 56.

This attention unit 54 corresponds to an attention described in Ashish Vaswani et al., "Attention Is All You Need", arXiv: 1706.03762, 2017. As an example, the attention unit 54 provides the sentence information and the initial element information (as well as the order information) to a layer for calculating a query. Furthermore, as an example, the attention unit 54 provides the initial element information to a layer for calculating a key.

The attention unit 54 includes a normalization layer. The normalization layer normalizes the result output from the previous layer. For example, the normalization layer normalizes the inner product result of the query and the key executed in the previous layer. The normalization layer executes the normalization processing using, for example, a softmax function. In the present embodiment, a plurality of values output from the normalization layer of the attention unit 54 are referred to as attention weights. The attention weight represents an estimated value of the relevance for each of the plurality of attribute items in the sentence. The plurality of attribute items in the attention weight correspond to the plurality of attribute items in the initial element information.

The main task execution unit 56 is a neural network including one or a plurality of layers. The main task execution unit 56 receives the sentence information from the input unit 52 for each of the plurality of sentences. The main task execution unit 56 may further receive the order information from the input unit 52 for each of the plurality of sentences. The main task execution unit 56 further receives the attention information from the attention unit 54 for each of the plurality of sentences.

The main task execution unit 56 outputs the analysis result for the target document based on these pieces of information received. For example, the main task execution unit 56 outputs the category of the target document. For example, the main task execution unit 56 outputs an important part of the target document. For example, the main task execution unit 56 outputs a new document obtained by converting the format of the target document.

The sentence output unit 44 and the attention weight output unit 46 function during learning. During the learning, the document analysis device 20 is provided with a training document from the learning device 30, and a plurality of parameters (coefficients and biases) included in the neural network unit 42 are adjusted.

The sentence output unit 44 outputs a plurality of sentences included in the training document to the learning device 30, during the learning. For example, the sentence output unit 44 outputs the included text data and the like for each of the plurality of sentences included in the training document, to the learning device 30.

During the learning, in the sentence application unit 40, one of a plurality of sentences included in the training document is designated as a target sentence by the learning device 30. When a target sentence is designated during the learning, the sentence application unit 40 provides to the neural network unit 42, the initial element information and the sentence information corresponding to the designated target sentence. The sentence application unit 40 may also provide the order information corresponding to the designated target sentence to the neural network unit 42.

When the sentence information and the initial element information (as well as the order information) corresponding to the designated target sentence are provided to the neural network unit 42 during the learning, the attention weight output unit 46 outputs the attention weight, output from the normalization layer included in the attention unit 54, to the learning device 30.

Figure 3:
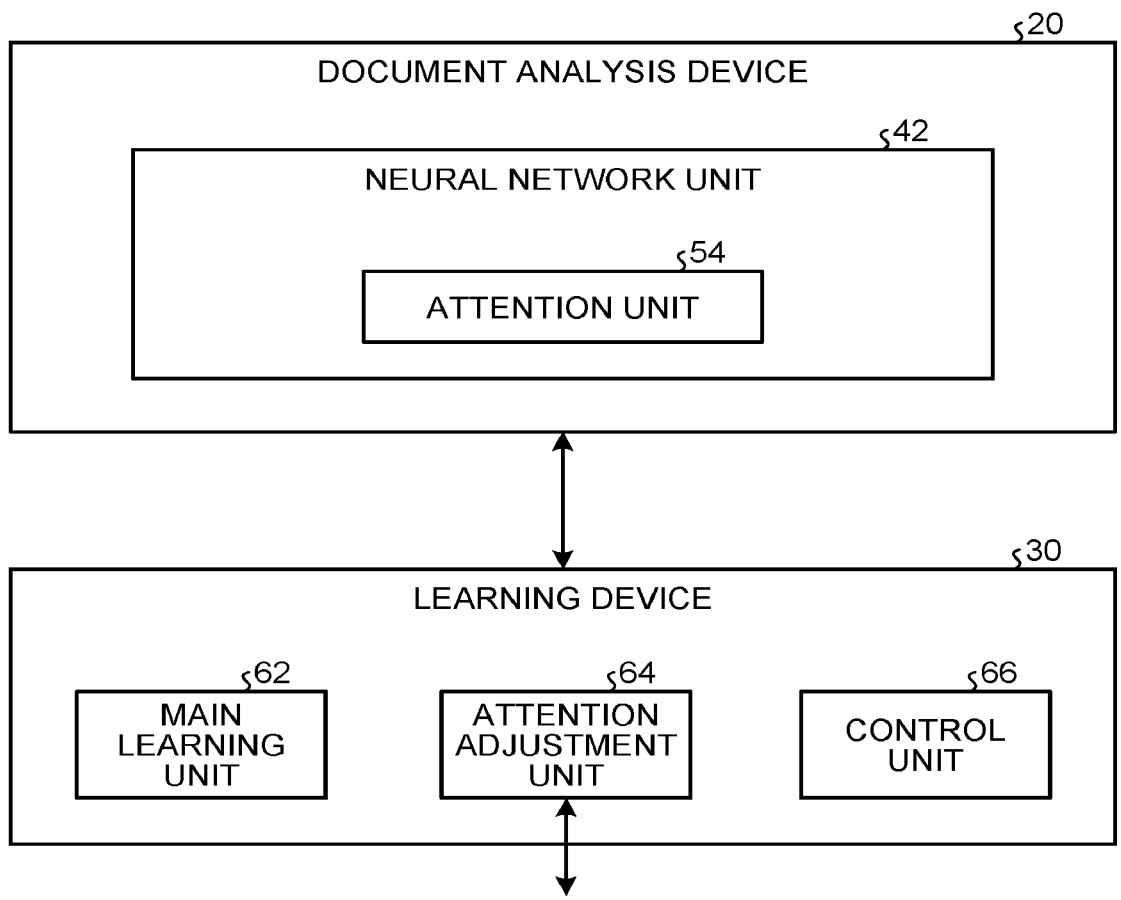
FIG. 3 is a diagram illustrating a configuration of a learning device and the document analysis device according to the first embodiment.

FIG. 3 is a diagram illustrating the configuration of the learning device 30 according to the first embodiment, together with the document analysis device 20. The learning device 30 includes a main learning unit 62, an attention adjustment unit 64, and a control unit 66.

The main learning unit 62 trains the neural network unit 42 in the document analysis device 20 based on teacher data generated in advance. The teacher data includes a training document and correct data. The training document is document data that can be received by the document analysis device 20. The correct data represents the execution result of the main task execution unit 56. More specifically, the correct data is ideal data that is desired to be output as the execution result of the main task execution unit 56 in the neural network unit 42, when a training document is provided to the document analysis device 20.

The attention adjustment unit 64 adjusts the parameters included in the attention unit 54 in the neural network unit 42. In the present embodiment, the attention adjustment unit 64 adjusts the parameters included in the attention unit 54 in accordance with an operation from a user during the training by the main learning unit 62.

The control unit 66 performs controlling such that the main learning unit 62 trains the neural network unit 42 or the attention adjustment unit 64 adjusts the parameters of the attention unit 54. For example, the control unit 66 causes the attention adjustment unit 64 to adjust the parameter of the attention unit 54 every time the training of the neural network unit 42 by the main learning unit 62 satisfies a predetermined condition.

Figure 4:
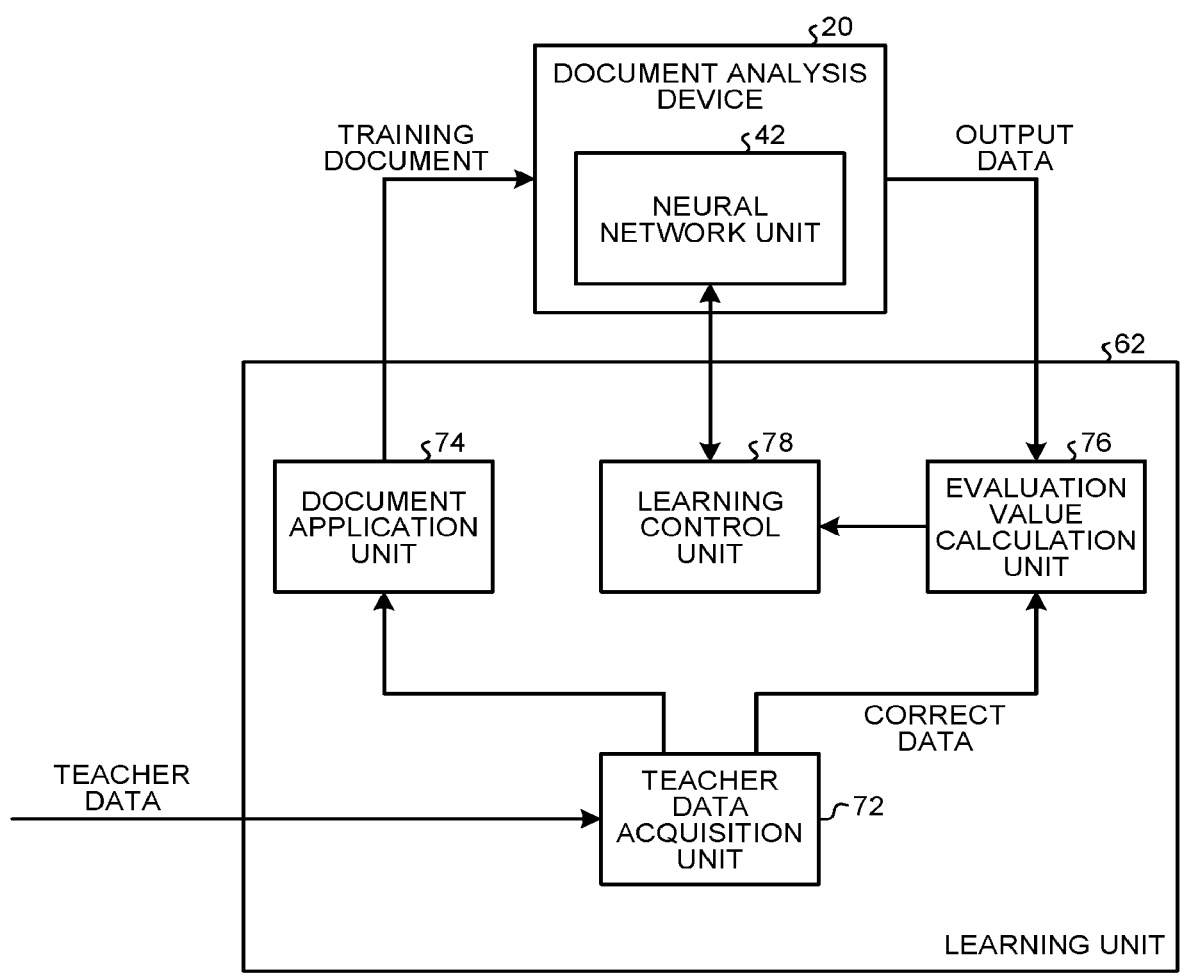
FIG. 4 is a diagram illustrating a configuration of a main learning unit and the document analysis device.

FIG. 4 is a diagram illustrating a configuration of the main learning unit 62 together with the document analysis device 20. The main learning unit 62 includes a teacher data acquisition unit 72, a document application unit 74, an evaluation value calculation unit 76, and a learning control unit 78.

The teacher data acquisition unit 72 acquires the teacher data. The teacher data acquisition unit 72 provides a training document included in the acquired teacher data to the document application unit 74. The teacher data acquisition unit 72 provides correct data included in the acquired teacher data to the evaluation value calculation unit 76.

The document application unit 74 provides the received training document to the document analysis device 20. Upon receiving the training document, the document analysis device 20 executes processing on the training document, and outputs output data as a processing result.

The evaluation value calculation unit 76 provides to a predetermined evaluation function, an error between the output data output from the document analysis device 20 in response to receiving the training document and the correct data included in the teacher data together with the training document. Then, the evaluation value calculation unit 76 outputs the calculation result obtained by the evaluation function as an evaluation value representing the evaluation of the error between the output data and the correct data.

The learning control unit 78 changes the parameter included in the neural network unit 42 included in the document analysis device 20 based on the evaluation value output from the evaluation value calculation unit 76. For example, the learning control unit 78 changes a plurality of parameters included in the neural network unit 42, through backpropagation.

The main learning unit 62 repeatedly executes such processing using a plurality of pieces of teacher data. Thus, the parameter is adjusted so that the document analysis device 20 outputs an appropriate processing result.

Figure 5:
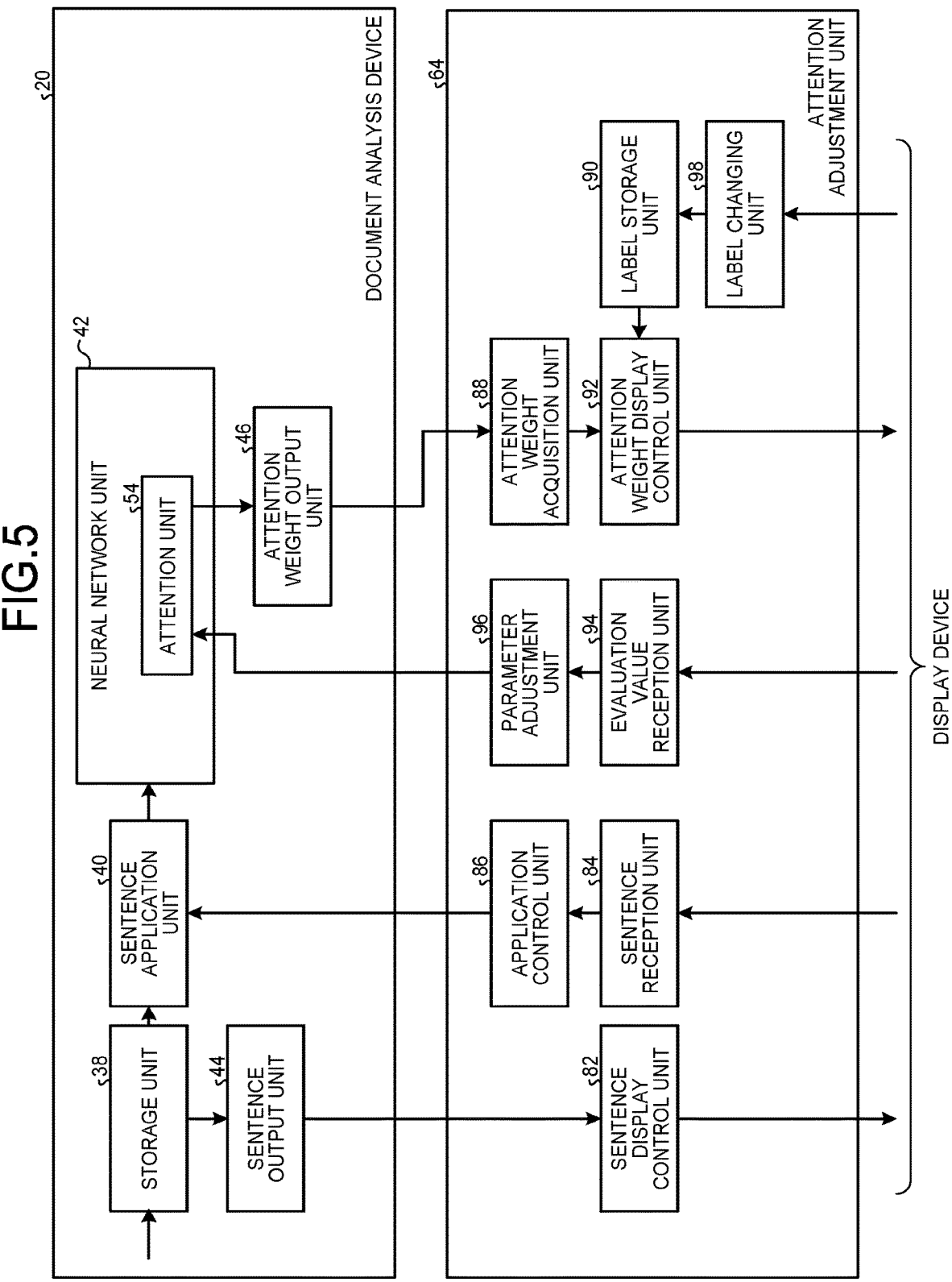
FIG. 5 is a diagram illustrating a configuration of an attention adjustment unit and the document analysis device according to the first embodiment.

FIG. 5 is a diagram illustrating the configuration of the attention adjustment unit 64 according to the first embodiment, together with the document analysis device 20. The attention adjustment unit 64 executes processing, with ongoing repeated learning processing executed by the main learning unit 62 using the plurality of pieces of teacher data temporarily stopped.

The attention adjustment unit 64 includes a sentence display control unit 82, a sentence reception unit 84, an application control unit 86, an attention weight acquisition unit 88, a label storage unit 90, an attention weight display control unit 92, an evaluation value reception unit 94, a parameter adjustment unit 96, and a label changing unit 98.

The sentence display control unit 82 causes a display device to display a plurality of sentences included in the training document being processed by the document analysis device 20. For example, the sentence display control unit 82 acquires a plurality of pieces of text data included in the plurality of sentences from the sentence output unit 44 of the document analysis device 20. Then, the sentence display control unit 82 causes the display device to display the plurality of pieces of text data thus acquired.

The sentence reception unit 84 receives an operation performed by the user to designate the target sentence from among a plurality of sentences included in the training document. For example, the sentence reception unit 84 causes the display device to display a user interface for selecting any one of the plurality of sentences. Then, the sentence reception unit 84 receives the target sentence designation operation via the user interface.

The application control unit 86 designates the target sentence for the sentence application unit 40 of the document analysis device 20. When the target sentence is designated, the sentence application unit 40 reads the sentence information and the initial element information (as well as the order information) corresponding to the target sentence from the storage unit 38, and provides the sentence information and the initial element information (as well as the order information) thus read to the neural network unit 42. Thus, the application control unit 86 causes the application of the sentence information and the initial element information (as well as the order information), corresponding to one target sentence in the plurality of sentences included in the training document, to the neural network unit 42.

When the sentence information and the initial element information (as well as the order information) corresponding to the target sentence are applied to the neural network unit 42, the attention weight acquisition unit 88 acquires the attention weight output from the normalization layer included in the attention unit 54. More specifically, the attention weight acquisition unit 88 acquires the attention weight from the attention weight output unit 46 of the document analysis device 20.

The label storage unit 90 stores a plurality of labels set in advance. The plurality of labels represent the contents of a plurality of attribute items represented by attention weights.

For example, the label is a text describing the content of the corresponding attribute item. For example, each of the plurality of labels is a text such as "title", "author and drafter", "date", "table of contents", "chapter and section heading", "chart description", "citation", or "footnote and remarks". Furthermore, for example, the label is a text such as "itemization symbol", "numbered list", "unnumbered list", or "indent". Furthermore, for example, the label is a text such as "special font" or "special size".

The attention weight display control unit 92 causes the display device to display each of the plurality of attribute items expressed by the attention weights acquired, in association with the estimated value of the relevance and the label.

The evaluation value reception unit 94 receives an error evaluation value for the attention weight input by the user.

The parameter adjustment unit 96 adjusts a plurality of parameters set to the attention unit 54 based on the error evaluation value for the attention weight received by the evaluation value reception unit 94. More specifically, the parameter adjustment unit 96 adjusts the plurality of parameters set to the attention unit 54, to reduce the error of the estimated value of the relevance with respect to each of the plurality of attribute items. For example, the parameter adjustment unit 96 adjusts the parameters set to the attention unit 54 to reduce the gradient of the error of the parameter, through backpropagation of the error evaluation value for the attention weight.

The label changing unit 98 changes the plurality of labels stored in the label storage unit 90 according to input information from the user. For example, when the content indicated by the label stored in the label storage unit 90 is not appropriate, the label changing unit 98 receives new information (for example, text) from the user and rewrites the content of the corresponding label.

Figure 6:
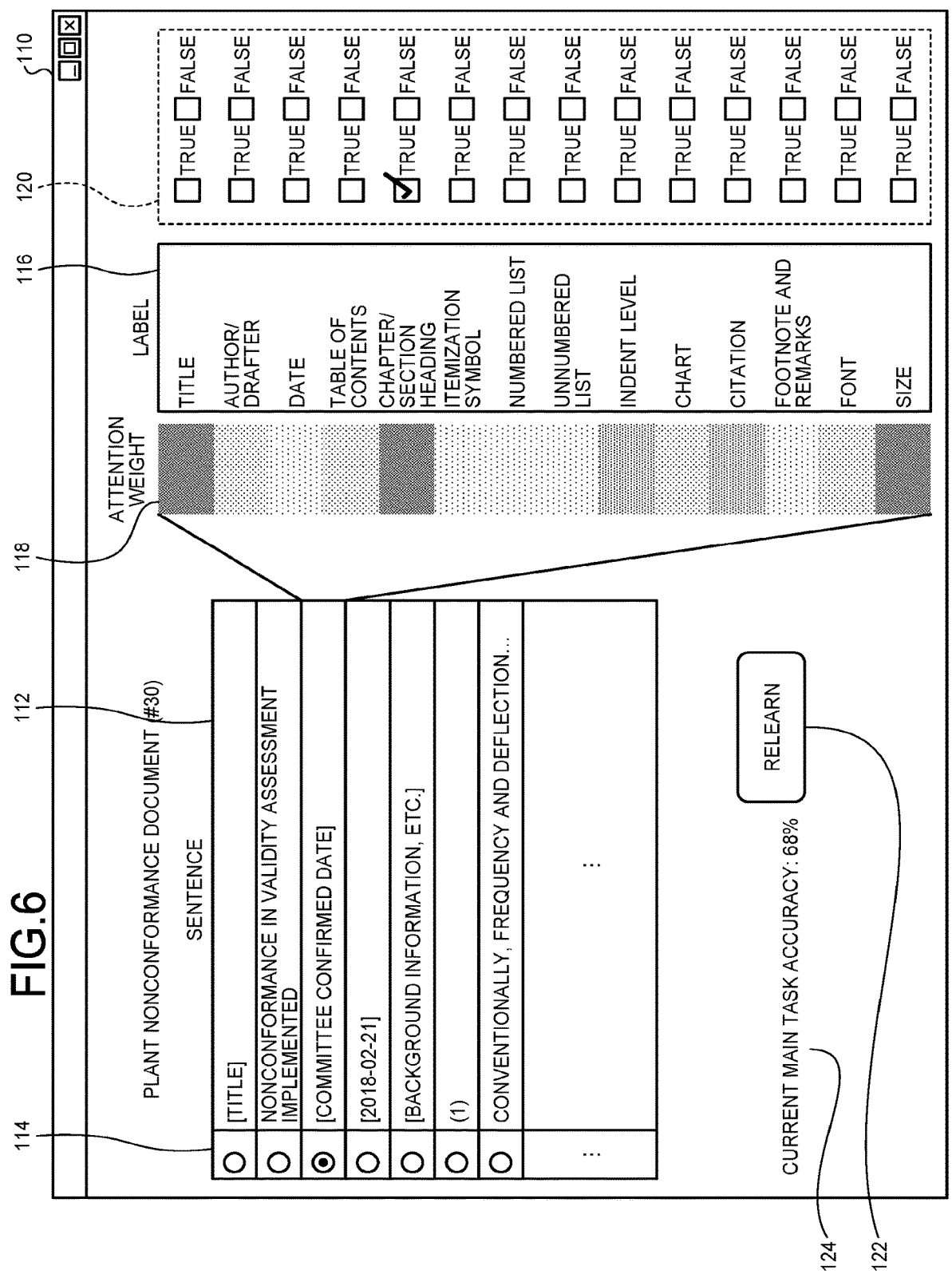
FIG. 6 is a diagram illustrating a user interface image according to the first embodiment.

FIG. 6 is a diagram illustrating an example of a user interface image 110 according to the first embodiment. The attention adjustment unit 64 causes the display device to display the user interface image 110 as illustrated in FIG. 6, for example.

The user interface image 110 includes a sentence area 112, a sentence reception area 114, a label area 116, an attention weight area 118, an evaluation value reception area 120, a relearn button 122, and an accuracy display area 124.

In the sentence area 112, a plurality of sentences included in the training document being processed by the document analysis device 20 are displayed. For example, the sentence display control unit 82 displays a plurality of sentences in the sentence area 112 in a listed manner.

In the sentence reception area 114, a user interface is displayed for enabling the designation of the target sentence. For example, the sentence reception unit 84 displays a plurality of buttons arranged in association with the plurality of sentences displayed in the sentence area 112, in the sentence reception area 114. When any one of the buttons is selected by the user, the sentence reception unit 84 receives a sentence corresponding to the selected button as the target sentence. Furthermore, the sentence display control unit 82 highlights the target sentence displayed in the sentence area 112, when the sentence reception unit 84 receives the target sentence designation operation.

In the label area 116, a plurality of labels set in advance are displayed. The attention weight display control unit 92 displays a plurality of labels in a listed arrangement in the label area 116.

In the attention weight area 118, an estimated value of the relevance of the target sentence for each of the plurality of attribute items expressed by the attention weight is displayed. The attention weight display control unit 92 displays a plurality of estimated values of relevance in a listed arrangement in the attention weight area 118. In this case, the attention weight display control unit 92 displays each of the plurality of relevance estimated values in association with a label representing the content of the corresponding attribute item.

In this example, the attention weight display control unit 92 displays icons with densities representing numerical values, as the relevance estimated values. For example, the attention weight display control unit 92 displays dark icons corresponding to attribute items with high relevance to the target sentence, and displays light icons corresponding to attribute items with low relevance to the target sentence.

Note that the attention weight display control unit 92 may display other pieces of information as the relevance estimated values instead of the one described above, as long as the estimated value of the relevance between the target sentence and the attribute item can be visually recognized.

For example, the attention weight display control unit 92 may display a numerical value, a specific word or character string, a specific shape icon, or a level meter representing the relevance estimated value.

In the evaluation value reception area 120, a user interface for receiving the error evaluation value for the attention weight from the user is displayed. The evaluation value reception unit 94 receives the error evaluation value for the attention weight based on the information input to the evaluation value reception area 120.

In this example, the evaluation value reception unit 94 displays a plurality check box sets enabling selection on true or false of the estimated value of the relevance to the target sentence for the plurality of respective attribute items. The evaluation value reception unit 94 displays the check box sets corresponding to the plurality of respective labels.

The user determines whether the estimated value of the relevance to the target sentence is true or false for each of the plurality of attribute items. The user selects a check box corresponding to true for an attribute item for which the estimated value of relevance is determined to be true. The user selects a check box corresponding to false for an attribute item for which the estimated value of relevance is determined to be false. In addition, the user does not select any check box when true or false of the estimated value of the relevance is unknown. With such a user interface displayed, the evaluation value reception unit 94 can acquire the error evaluation value, which is a binary value indicative of true or false of the relevance estimated value, for each of the plurality of attribute items.

Note that error evaluation value acquired by the evaluation value reception unit 94 is not limited to the binary evaluated value, and may be a multi-value evaluated value. For example, the evaluation value reception unit 94 may acquire error evaluation values in the scale of 1 to 10.

The evaluation value reception unit 94 acquires an error evaluation value for each of a plurality of attribute items each time a target sentence is selected.

The relearn button 122 receives the start of the adjustment of parameters included in the attention unit 54. When the relearn button 122 is pressed by the user, the attention adjustment unit 64 starts the adjustment of the parameters included in the attention unit 54 of the neural network unit 42. In this case, the attention adjustment unit 64 adjusts the parameters included in the attention unit 54 based on the error evaluation value for the attention weight.

The accuracy display area 124 includes estimation accuracy obtained as a result of executing the main learning processing. This enables the user to recognize the estimation accuracy of the current main task.

Figure 7:
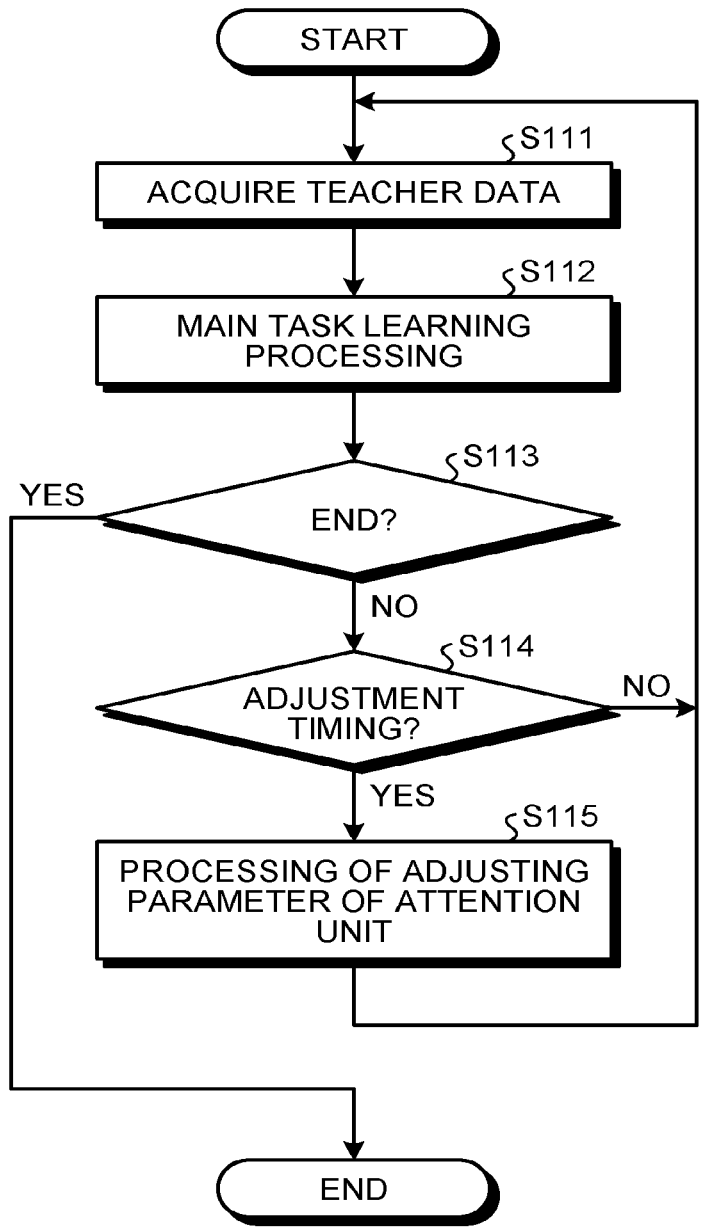
FIG. 7 is a flowchart illustrating a flow of learning processing according to the first embodiment.

FIG. 7 is a flowchart illustrating a flow of learning processing executed by the learning device 30 according to the first embodiment. The control unit 66 of the learning device 30 controls the training of the document analysis device 20 according to the flow illustrated in FIG. 7.

First of all, in S111, the control unit 66 acquires one teacher data. Then, in S112, the control unit 66 causes the main learning unit 62 to execute main task learning processing using the one teacher data acquired. Specifically, in S112, the main learning unit 62 trains the neural network unit 42 included in the document analysis device 20.

Then, in S113, the control unit 66 determines whether an end condition is satisfied. For example, the control unit 66 determines that the end condition is satisfied when the main task learning processing has been executed using a predetermined number of teacher data pieces, when the main task learning processing has been executed for a predetermined period of time, or when the estimation accuracy of the main task reaches a predetermined value. When the end condition is satisfied (Yes in S113), the control unit 66 ends the flow. When the end condition is not satisfied (No in S113), the control unit 66 moves the processing to S114.

In S114, the control unit 66 determines whether a parameter adjustment timing for the attention unit 54 has arrived. For example, the control unit 66 determines whether the training of the neural network unit 42 by the main learning unit 62 has satisfied a predetermined condition. More specifically, the control unit 66 determines that the predetermined condition is satisfied, when the main task learning processing has been executed using a predetermined number of teacher data pieces or when the main task learning processing has been executed for a predetermined period of time.

When the adjustment timing has not arrived yet (No in S114), the control unit 66 moves the processing back to S111 and repeats the processing from S111. When the adjustment timing has arrived (Yes in S114), the control unit 66 moves the processing to S115.

In S115, the control unit 66 causes the attention adjustment unit 64 to adjust the parameters of the attention unit 54. More specifically, in S115, the attention adjustment unit 64 executes processing in FIG. 8 described below. When the processing in S115 ends, the control unit 66 moves the processing back to S111 and repeats the processing from S111.

Figure 8:
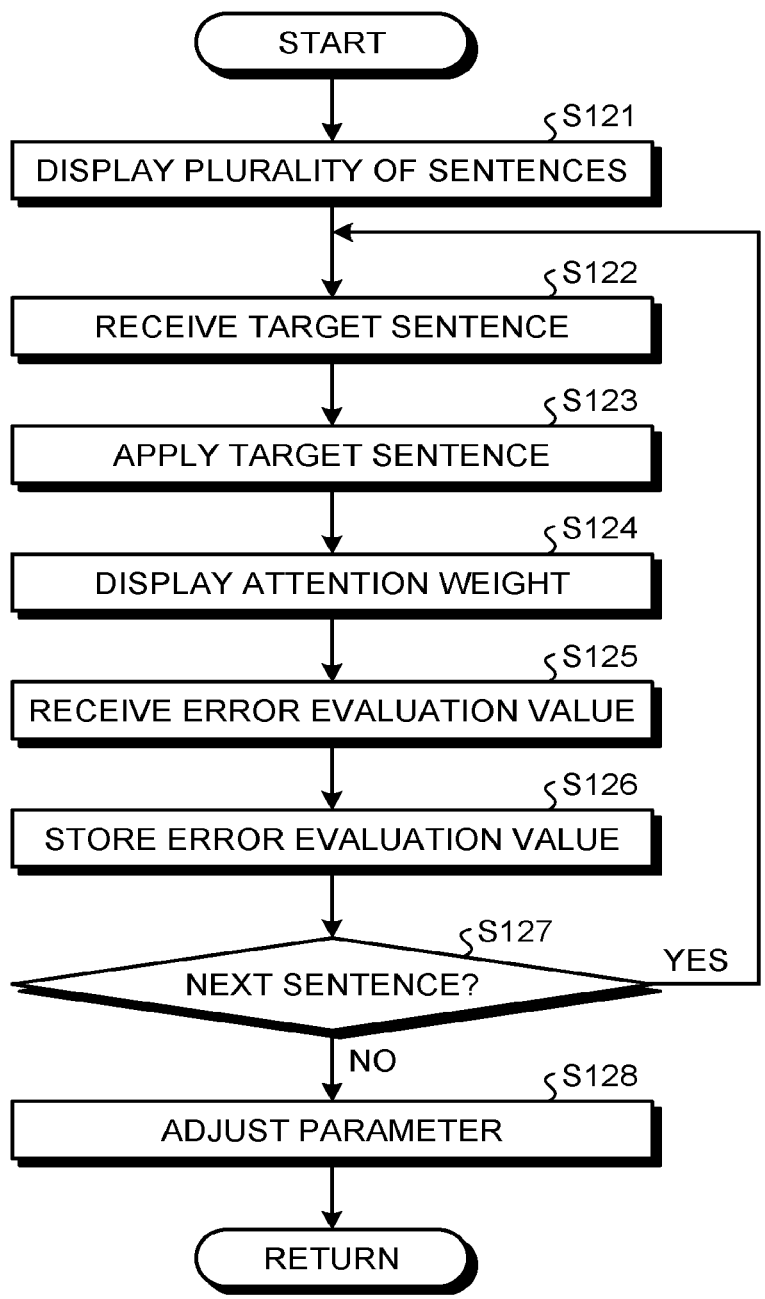
FIG. 8 is a flowchart illustrating a flow of parameter adjustment processing.

FIG. 8 is a flowchart illustrating a flow of parameter adjustment processing by the attention adjustment unit 64. The attention adjustment unit 64 adjusts the parameters of the attention unit 54 according to the flow illustrated in FIG. 8.

First of all, in S121, the attention adjustment unit 64 causes the display device to display a plurality of sentences included in the training document being processed. Then, in S122, the attention adjustment unit 64 receives the target sentence designation operation.

Then, in S123, the attention adjustment unit 64 provides information designating the target sentence to the sentence application unit 40 of the document analysis device 20. This enables the attention adjustment unit 64 to apply the sentence information and the initial element information (as well as the order information), corresponding to the target sentence, to the neural network unit 42 of the document analysis device 20. Upon being provided with the sentence information and the initial element information (as well as the order information), the neural network unit 42 executes processing to output the attention weight.

Then, in S124, the attention adjustment unit 64 acquires the attention weight from the neural network unit 42 and causes the display device to display the attention weight. Then, in S125, the attention adjustment unit 64 receives the error evaluation value for the attention weight input by the user. Then, in S126, the attention adjustment unit 64 stores the error evaluation value for the received attention weight.

Next, in S124, the attention adjustment unit 64 determines whether to execute the processing for the next sentence. For example, the attention adjustment unit 64 determines not to execute the processing on the next sentence when an instruction to start the adjustment is issued from the user (for example, when the relearn button 122 is pressed). Otherwise, the attention adjustment unit 64 determines to execute the processing on the next sentence.

When the processing is to be executed for the next sentence (Yes in S127), the attention adjustment unit 64 moves the processing back to S122 and repeats the processing from S122. When the processing is not to be executed for the next sentence (No in S127), the attention adjustment unit 64 moves the processing to S128.

In S128, the attention adjustment unit 64 adjusts the plurality of parameters set to the attention unit 54 based on the error evaluation value for the attention weight for the plurality of target sentences. When the processing of S128 ends, the attention adjustment unit 64 ends this flow.

As described above, the document analysis device 20 according to the first embodiment can output the attention weight to the outside when the target sentence is provided. Thus, the document analysis device 20 can adjust the parameters included in the attention unit 54, so that the document can be analyzed with high accuracy.

Furthermore, on the upstream side of the neural network unit 42, the document analysis device 20 analyzes the sentence to generate the initial element information representing an initial value of the relevance for each of the plurality of attribute items. Thus, the document analysis device 20 can associate a plurality of values expressed by the attention weights with the plurality of attribute items included in the initial element information. As a result, an error of the plurality of values represented by the attention weight can be easily evaluated. Thus, with the document analysis device 20, the parameters included in the attention unit 54 can be adjusted with high accuracy.

Furthermore, the learning device 30 according to the first embodiment causes the display device to display the estimated value of the relevance to each of the plurality of attribute items represented by the attention weight with a label attached to the estimated value. Thus, the learning device 30 enables the user to evaluate an error with respect to the attention weight. All things considered, with the learning device 30, the parameters included in the attention unit 54 can be adjusted with high accuracy, so that the document analysis device 20 can perform document analysis with high accuracy.

Second Embodiment

Next, an information processing system 10 according to a second embodiment will be described. The information processing system 10 according to the second embodiment has substantially the same function and configuration as those of the first embodiment. Thus, parts having substantially the same function and configuration are denoted by the same reference numerals, and the detailed description will only be given to the differences from the first embodiment.

Figure 9:
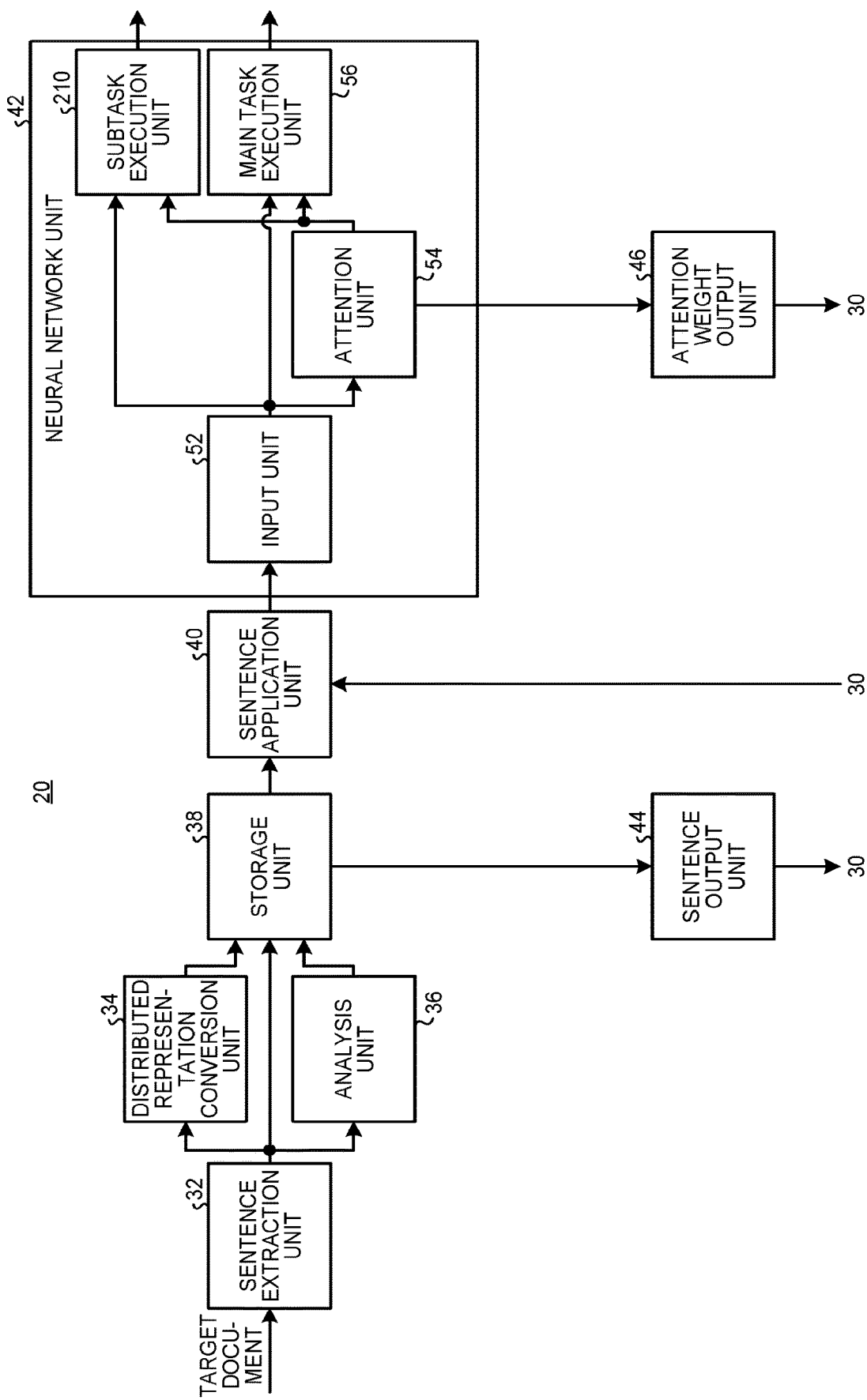
FIG. 9 is a diagram illustrating a configuration of a document analysis device according to a second embodiment.

FIG. 9 is a diagram illustrating a configuration of a document analysis device 20 according to the second embodiment. In the second embodiment, the neural network unit 42 executes the main task and a subtask different from the main task, on the target document. Thus, a neural network unit 42 of the document analysis device 20 according to the second embodiment further includes a subtask execution unit 210.

The subtask execution unit 210 is a neural network including a plurality of layers. The subtask execution unit 210 executes the subtask based on attention information estimated by the attention unit 54 for each of a plurality of sentences.

The subtask execution unit 210 receives the sentence information from the input unit 52 for each of the plurality of sentences. The subtask execution unit 210 may further receive the order information from the input unit 52 for each of the plurality of sentences. The subtask execution unit 210 further receives the attention information from the attention unit 54 for each of the plurality of sentences.

The subtask execution unit 210 outputs the analysis result for the target document, different from that obtained by the main task execution unit 56, based on these pieces of information thus received. For example, the main task execution unit 56 and the subtask execution unit 210 execute different types of processing on the same document and output different analysis results. For example, the main task execution unit 56 outputs the category of the target document, and the subtask execution unit 210 outputs an important part of the target document.

For example, the main task execution unit 56 and the subtask execution unit 210 may output the same type of analysis result for different types of documents. For example, the main task execution unit 56 outputs a category for a report describing a result of a response to a failure of a device used by a customer, and the subtask execution unit 210 outputs the category of a memo describing the content of the trouble that has occurred in the company.

Furthermore, in the present embodiment, the main task execution unit 56 and the subtask execution unit 210 both use the attention information output from the attention unit 54, to output the analysis result. Thus, the main task execution unit 56 and the subtask execution unit 210 execute different tasks using the common attention information.

Figure 10:
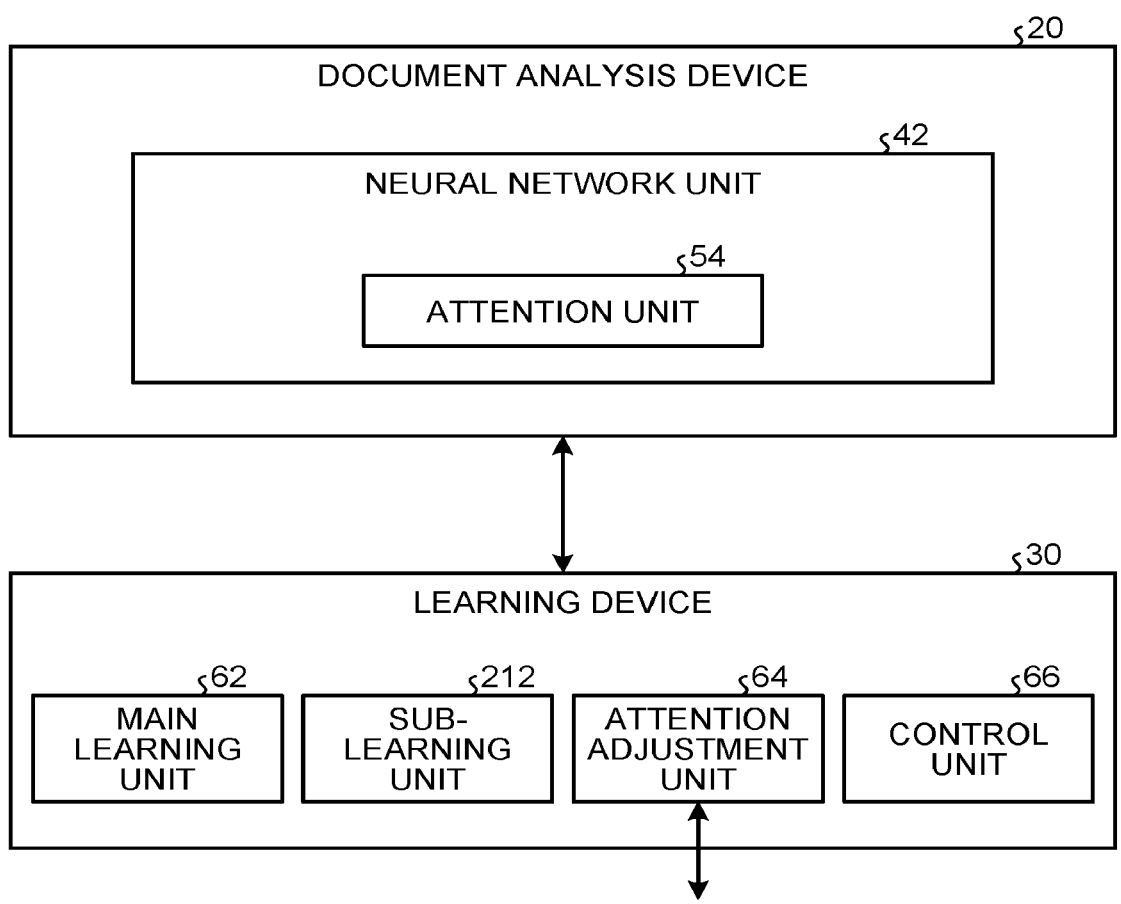
FIG. 10 is a diagram illustrating a configuration of a learning device and the document analysis device according to the second embodiment.

FIG. 10 is a diagram illustrating a configuration of a learning device 30 according to the second embodiment together with the document analysis device 20. The learning device 30 according to the second embodiment further includes a sub-learning unit 212.

In the second embodiment, the main learning unit 62 trains the neural network unit 42 based on teacher data including a training document and correct data representing the execution result of the main task execution unit 56. On the other hand, the sub-learning unit 212 trains the neural network unit 42 based on teacher data including a training document and correct data representing the execution result of the subtask execution unit 210.

In the second embodiment, the control unit 66 performs controlling to train the neural network unit 42 by the main learning unit 62, to train the neural network unit 42 by the sub-learning unit 212, or to adjust the parameters of the attention unit 54 by the attention adjustment unit 64. For example, the control unit 66 alternately executes the training of the neural network unit 42 by the main learning unit 62 and the training of the neural network unit 42 by the sub-learning unit 212 by switching between both processings (i.e., trainings) according to a predetermined condition. The control unit 66 causes the attention adjustment unit 64 to adjust the parameter of the attention unit 54 every time the trainings of the neural network unit 42 by the main learning unit 62 and by the sub-learning unit 212 satisfy a predetermined condition.

The main learning unit 62 and the sub-learning unit 212 are different from each other in the teacher data to be acquired, but have the same internal configuration. Thus, the learning device 30 may implement the main learning unit 62 and the sub-learning unit 212 by executing the same software modules while switching from one software module to the other.

Figure 11:
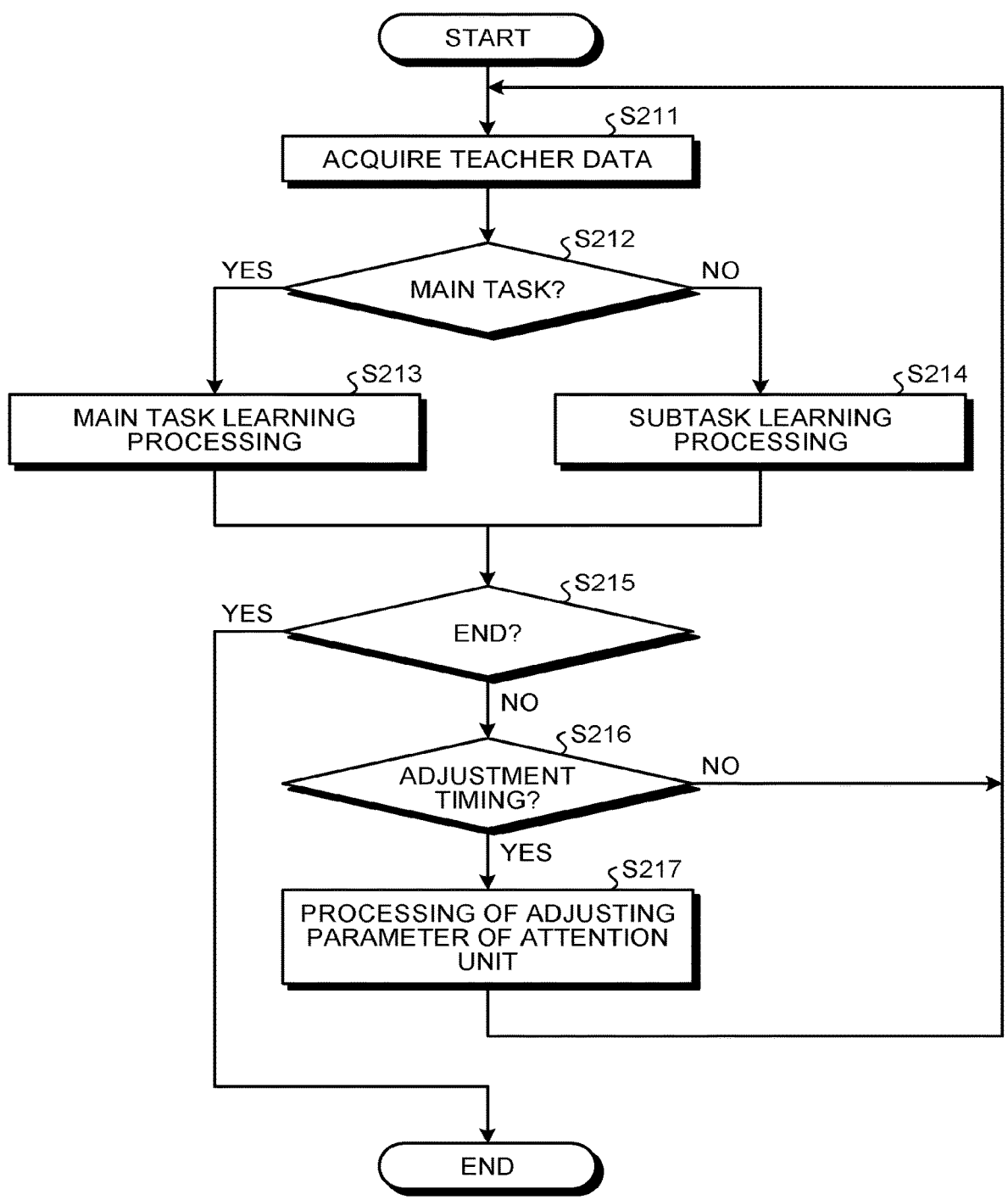
FIG. 11 is a flowchart illustrating a flow of learning processing according to the second embodiment.

FIG. 11 is a flowchart illustrating a flow of learning processing executed by the learning device 30 according to the second embodiment. The control unit 66 of the learning device 30 controls the training of the document analysis device 20 according to the flow illustrated in FIG. 11.

First of all, in S211, the control unit 66 acquires one teacher data. Then, in S212, the control unit 66 determines whether to execute the main task learning processing or to execute the subtask learning processing. For example, the control unit 66 alternately executes the main task learning processing and the subtask learning processing, with one processing switched to the other every time the processing is executed for predetermined times. Furthermore, the control unit 66 may switch between the main task learning processing and the subtask learning processing, based on the format of the training document included in the acquired teacher data.

When the main task learning processing is to be executed (Yes in S212), in S213, the control unit 66 causes the main learning unit 62 to execute main task learning processing using the one teacher data acquired. When the subtask learning processing is to be executed (No in S212), in S214, the control unit 66 causes the sub-learning unit 212 to execute subtask learning processing using the one teacher data acquired.

When the processing in S213 or S214 is completed, in S215, the control unit 66 determines whether the end condition is satisfied. When the end condition is satisfied (Yes in S215), the control unit 66 ends the flow. When the end condition is not satisfied (No in S215), the control unit 66 moves the processing to S216.

In S216, the control unit 66 determines whether a parameter adjustment timing for the attention unit 54 has arrived. For example, the control unit 66 determines whether the trainings of the neural network unit 42 by the main learning unit 62 and by the sub-learning unit 212 have satisfied a predetermined condition. More specifically, the control unit 66 determines that the predetermined condition is satisfied, when the main task and the subtask learning processing has been executed using a predetermined number of teacher data pieces or when the main task and the subtask learning processing has been executed for a predetermined period of time. When the adjustment timing has not arrived yet (No in S216), the control unit 66 moves the processing back to S211 and repeats the processing from S211. When the adjustment timing has arrived (Yes in S216), the control unit 66 moves the processing to S217.

In S217, the control unit 66 causes the attention adjustment unit 64 to adjust the parameters of the attention unit 54. When the processing in S217 ends, the control unit 66 moves the processing back to S211 and repeats the processing from S211.

Figure 12:
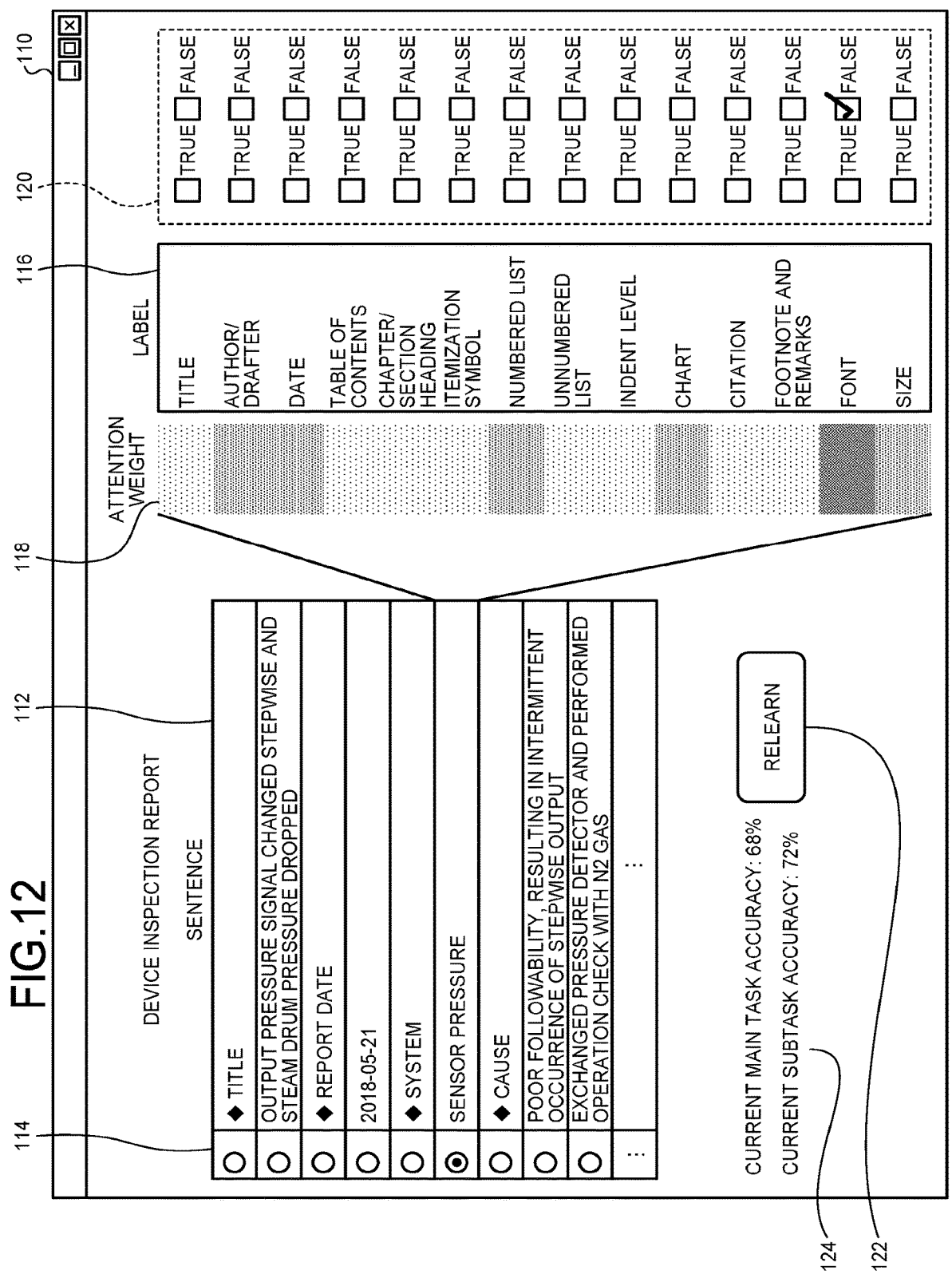
FIG. 12 is a diagram illustrating a user interface image according to the second embodiment.

FIG. 12 is a diagram illustrating an example of a user interface image 110 according to the second embodiment. In the second embodiment, the attention adjustment unit 64 causes the display device to display the user interface image 110 as illustrated in FIG. 12, for example.

The user interface image 110 according to the second embodiment differs from that in the first embodiment in the content of information included in the accuracy display area 124. The other areas are the same as the counterparts. In the second embodiment, the accuracy display area 124 includes both estimation accuracy obtained as a result of executing the main learning processing and estimation accuracy obtained as a result of executing the sub-learning processing. This enables the user to recognize the estimation accuracy of the current main task and of the current subtask.

In the user interface image 110 according to the second embodiment, the same information is displayed in the label area 116 and the attention weight area 118 in both of the cases where the main task learning processing is executed and where the subtask learning processing is executed. Thus, the user can adjust the parameters of the attention unit 54 using the common user interface, even during the main task learning processing is being executed or the subtask learning processing is being executed.

As described above, the document analysis device 20 according to the second embodiment executes two different tasks using the common attention unit 54. Thus, with the document analysis device 20, documents of various structures and formats can be analyzed with high accuracy.

In addition, with the learning device 30 according to the second embodiment, trainings for two different tasks executed in the document analysis device 20 can be performed in parallel. Furthermore, the learning device 30 adjusts the parameters of the attention unit 54 while executing trainings for two different tasks, whereby the parameters of the attention unit 54 can be adapted to the two different tasks. Thus, with the learning device 30 according to the second embodiment, the document analysis device 20 can analyze documents of various structures and formats with high accuracy.

Third Embodiment

Next, an information processing system 10 according to a third embodiment will be described. The information processing system 10 according to the third embodiment has substantially the same function and configuration as those of the first embodiment and the second embodiment. Thus, parts having substantially the same function and configuration are denoted by the same reference numerals, and the detailed description will only be given to the differences from the first embodiment and the second embodiment.

Figure 13:
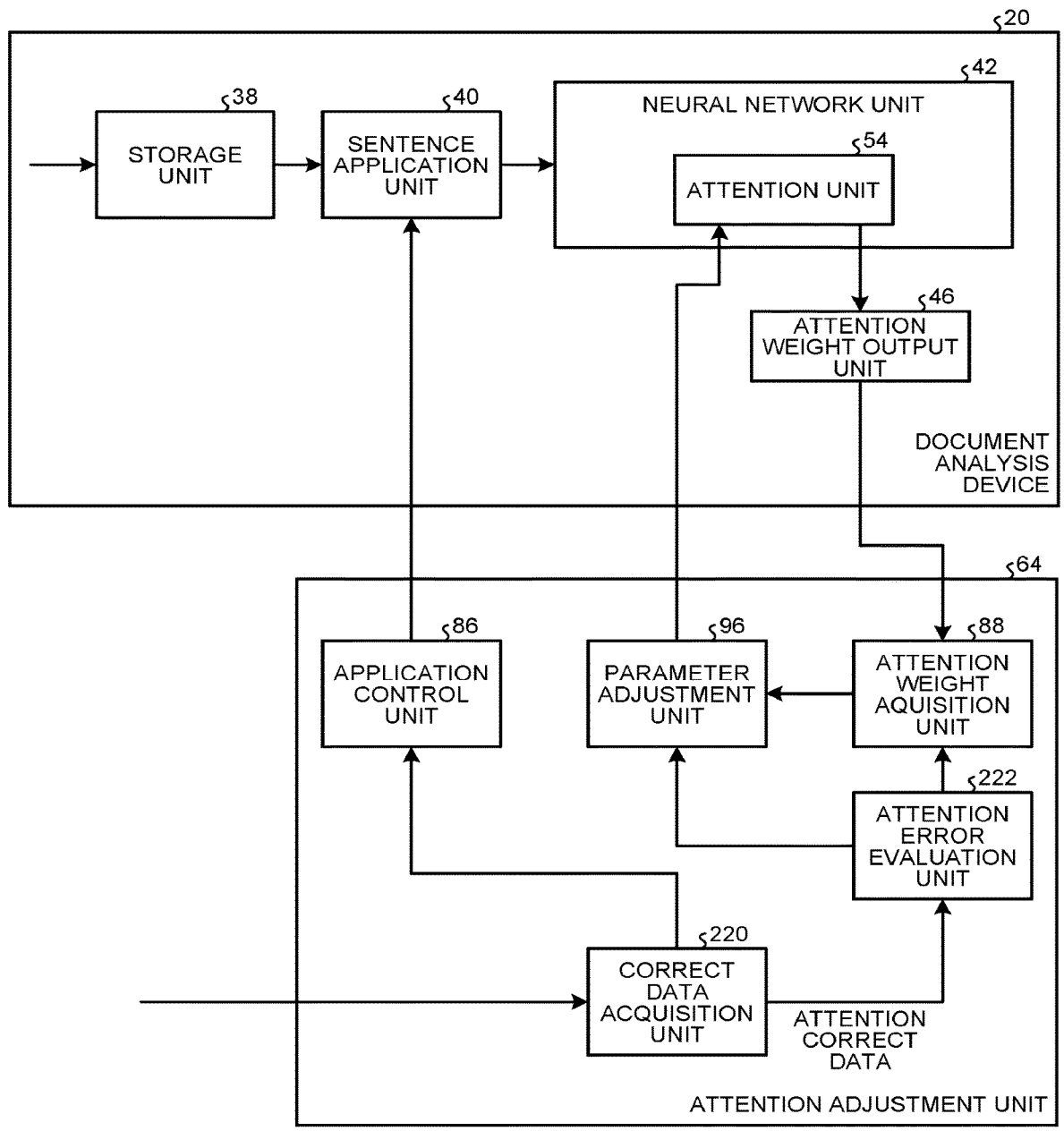
FIG. 13 is a diagram illustrating a configuration of an attention adjustment unit and a document analysis device according to a third embodiment.

FIG. 13 is a diagram illustrating the configuration of an attention adjustment unit 64 according to the third embodiment, together with the document analysis device 20. The attention adjustment unit 64 according to the third embodiment includes a correct data acquisition unit 220, the application control unit 86, the attention weight acquisition unit 88, an attention error evaluation unit 222, and the parameter adjustment unit 96.

The correct data acquisition unit 220 acquires attention correct data representing a correct value of the attention weight in association with each of a plurality of sentences included in a training document. The attention correct data is generated in advance by a user or the like, for example.

The correct data acquisition unit 220 selects one target sentence from a plurality of sentences included in the training document. Then, the correct data acquisition unit 220 provides the information designating the selected target sentence to the application control unit 86, and provides the attention correct data corresponding to the selected target sentence to the attention error evaluation unit 222.

The application control unit 86 designates the target sentence for the sentence application unit 40 of the document analysis device 20. When the target sentence is designated, the sentence application unit 40 reads the sentence information and the initial element information (as well as the order information) corresponding to the target sentence from the storage unit 38, and provides the sentence information and the initial element information (as well as the order information) thus read to the neural network unit 42.

When the sentence information and the initial element information (as well as the order information) corresponding to the target sentence are applied to the neural network unit 42, the attention weight acquisition unit 88 acquires the attention weight output from the normalization layer included in the attention unit 54.

The attention error evaluation unit 222 calculates an error evaluation value for the attention weight, based on the attention weight acquired and the attention correct data representing the correct value of the attention weight corresponding to the target sentence. For example, the attention error evaluation unit 222 calculates an error evaluation value for the attention weight by providing, to a predetermined evaluation function, an error between the attention weight acquired and the attention correct data.

The parameter adjustment unit 96 adjusts a plurality of parameters set to the attention unit 54 based on the error evaluation value for the attention weight calculated. More specifically, the parameter adjustment unit 96 adjusts the plurality of parameters set to the attention unit 54, to reduce the error of the estimated value of the relevance with respect to each of the plurality of attribute items. For example, the parameter adjustment unit 96 adjusts the parameters set to the attention unit 54 to reduce the gradient of the error of the parameter, through backpropagation of the error evaluation value for the attention weight. Then, the attention adjustment unit 64 with the configuration described above repeats the processing described above for each of the plurality of sentences included in the training document.

Furthermore, the learning device 30 according to the third embodiment acquires the correct data for the estimated value of the relevance to each of the plurality of attribute items expressed by the attention weight. Thus, the learning device 30 can calculate the error evaluation value for the attention weight by comparing the attention weight acquired from the document analysis device 20 with the correct data. The learning device 30 can adjust the parameters included in the attention unit 54 based on the error evaluation value thus calculated. All things considered, with the learning device 30, the parameters included in the attention unit 54 can be adjusted with high accuracy, so that the document analysis device 20 can perform document analysis with high accuracy.

Hardware configuration of information processing system 10

Figure 14:
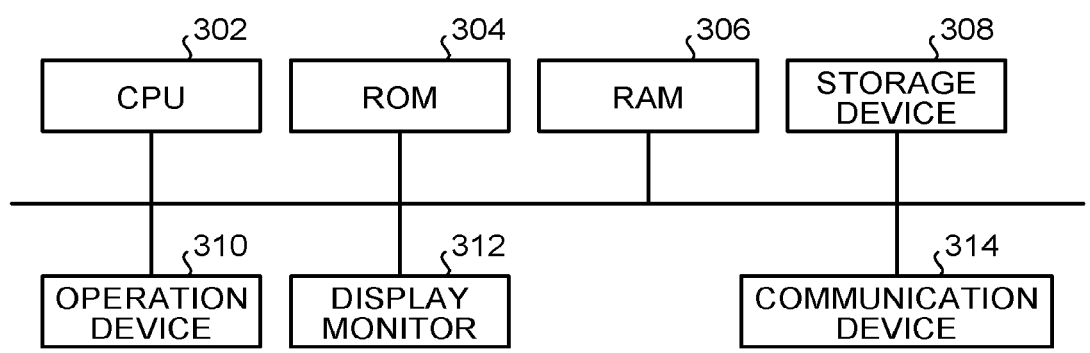
FIG. 14 is a diagram illustrating a hardware configuration of an information processing system.

FIG. 14 is a hardware block diagram of the information processing system 10. As an example, the information processing system 10 is implemented with a hardware configuration similar to that of a general computer (information processing device). The information processing system 10 includes a central processing unit (CPU) 302, a read only memory (ROM) 304, a random access memory (RAM) 306, a storage device 308, an operation device 310, a display monitor 312, and a communication device 314. The components are connected to each other by a bus.

The ROM 304 stores a program, various setting information, and the like used for controlling the information processing system 10, in a non-rewritable manner. The RAM 306 is a volatile storage medium such as synchronous dynamic random access memory (SDRAM). The RAM 306 functions as a work area for the CPU 302.

The CPU 302 executes various processes in cooperation with various programs stored in advance in the ROM 304 or the storage device 308 using a predetermined area of the RAM 306 as a work area, and performs overall control on operations of the components of the document analysis device 20 and the learning device 30. The CPU 302 controls the operation device 310, the display monitor 312, and the communication device 314 in cooperation with a program stored in advance in the ROM 304 or the storage device 308.

The storage device 308 is a rewritable recording device such as a semiconductor storage medium including a flash memory or a magnetically or optically recordable storage medium. The storage device 308 stores a program, various setting information, and the like used for controlling the information processing system 10.

The operation device 310 is an input device such as a mouse and a keyboard. The operation device 310 receives information input by the user and outputs the received information to the CPU 302.

The display monitor 312 is an example of the display device, and displays information to the user. The display monitor 312 receives information from the CPU 302 and displays the received information. The communication device 314 communicates with an external device and transmits/receives information via a network or the like.

The program executed in the information processing system 10 of the present embodiment is a file in an installable format or an executable format and is provided while being recorded in a computer-readable recording medium such as a compact disc (CD)-ROM, a flexible disk (FD), CD-R, or a digital versatile disk (DVD).

Furthermore, the program executed in the information processing system 10 of the present embodiment may be provided while being stored on a computer connected to a network such as the Internet and downloaded via the network. Furthermore, the program executed in the information processing system 10 of the present embodiment may be configured to be provided or distributed via a network such as the Internet. Furthermore, the program executed in the information processing system 10 of the present embodiment may be configured to be provided by being embedded in advance in a ROM or the like.

A program for causing the information processing device to function as the document analysis device 20 has a modular configuration including a sentence extraction module, a distributed representation conversion module, an analysis unit module, a sentence application module, a neural network module (an input module, an attention module, a main task execution module, and a subtask execution module), a sentence output module, and an attention weight output module. When this program is executed by the CPU 302 (processor), the modules are loaded onto the RAM 306 (main storage device) to cause the CPU 302 to function as the sentence extraction unit 32, the distributed representation conversion unit 34, the analysis unit 36, the storage unit 38, the sentence application unit 40, the neural network unit 42 (the input unit 52, the attention unit 54, the main task execution unit 56, and the subtask execution unit 210), the sentence output unit 44, and the attention weight output unit 46. Note that some or all of the sentence extraction unit 32, the distributed representation conversion unit 34, the analysis unit 36, the storage unit 38, the sentence application unit 40, the neural network unit 42 (the input unit 52, the attention unit 54, the main task execution unit 56, and the subtask execution unit 210), the sentence output unit 44, and the attention weight output unit 46 may be configured by hardware.

A program for causing the information processing apparatus to function as the learning device 30 has a modular configuration including a main learning module, an attention adjustment module, a control module, and a sub-learning module. When this program is executed by the CPU 302 (processor), the modules are loaded onto the RAM 306 (main storage device) to cause the CPU 302 to function as the main learning unit 62, the attention adjustment unit 64, the control unit 66, and the sub-learning unit 212. Note that some or all of the main learning unit 62, the attention adjustment unit 64, the control unit 66, and the sub-learning unit 212 may be configured by hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document analysis device comprising:
one or more hardware processors configured to function as:
a sentence extraction unit configured to extract a plurality of sentences in a target document;
an analysis unit configured to generate, for each of the plurality of sentences, initial element information representing an initial value of relevance to each of a plurality of predetermined attribute items; and
a neural network unit configured to receive sentence information representing content of an included text and the initial element information, and output a result of executing a main task on the target document, for each of the plurality of sentences, wherein
the neural network unit comprises:
an attention unit configured to receive the sentence information and the initial element information, calculate an attention weight representing an estimated value of relevance to each of the plurality of attribute items, and output attention information according to the attention weight, for each of the plurality of sentences; and
a main task execution unit configured to execute the main task based on the attention information for each of the plurality of sentences.

2. The document analysis device according to claim 1, wherein any one of the plurality of attribute items is an item representing a role of the sentence in the document, an item representing a structure of an area including the sentence in the document, or an item representing character decoration included in the sentence.

3. The document analysis device according to claim 2, wherein
the one or more hardware processors are configured to further function as:
a sentence application unit configured to provide, to the neural network unit, the initial element information and the sentence information corresponding to a target sentence in a plurality of sentences included in a training document, during learning; and
an attention weight output unit configured to output, as the attention weight, a plurality of values output from a normalization layer included in the attention unit, when the initial element information and the sentence information corresponding to the target sentence are provided to the neural network unit, during the learning.

4. The document analysis device according to claim 1, wherein
the neural network unit executes, on the target document, the main task and a subtask that is different from the main task, and the neural network unit further comprises a subtask execution unit configured to execute the subtask based on the attention information estimated by the attention unit for each of the plurality of sentences.

5. A learning device that trains a document analysis device, the document analysis device comprising:
one or more hardware processors configured to function as:
a sentence extraction unit configured to extract a plurality of sentences included in a target document,
an analysis unit configured to generate, for each of the plurality of sentences, initial element information representing an initial value of relevance to each of a plurality of predetermined attribute items, and
a neural network unit configured to receive sentence information representing content of an included text and the initial element information, and output a result of executing a main task on the target document, for each of the plurality of sentences, wherein
the neural network unit comprises:
an attention unit configured to receive the sentence information and the initial element information, calculate an attention weight representing an estimated value of relevance to each of the plurality of attribute items, and output attention information according to the attention weight, for each of the plurality of sentences, and
a main task execution unit configured to execute the main task based on the attention information for each of the plurality of sentences, and
the learning device comprises:
one or more hardware processors configured to function as:
a main learning unit configured to train the neural network unit based on teacher data including a training document and correct data representing an execution result of the main task execution unit; and
an attention adjustment unit configured to adjust a parameter included in the attention unit, wherein
the attention adjustment unit comprises:
an application control unit configured to cause application of the initial element information and the sentence information corresponding to one target sentence in a plurality of sentences included in the training document, to the neural network unit,
an attention weight acquisition unit configured to acquire the attention weight output from a normalization layer included in the attention unit, when the initial element information and the sentence information corresponding to the target sentence are applied to the neural network unit, and
a parameter adjustment unit configured to adjust a plurality of parameters set to the attention unit, based on an error evaluation value for the attention weight.

6. The learning device according to claim 5, wherein
the one or more hardware processors of the learning device are configured to further function as:
an attention weight display control unit configured to cause a display device to display, for each of the plurality of attribute items, an estimated value of relevance represented by the attention weight and a label representing content in association with each other; and
an evaluation value reception unit configured to receive the error evaluation value for the attention weight that is input by a user.

7. The learning device according to claim 6, wherein
the one or more hardware processors of the learning device are configured to further function as:
a sentence display control unit configured to cause the display device to display the plurality of sentence included in the training document; and
a sentence reception unit configured to receive an operation of designating the target sentence by the user, from the plurality of sentences displayed on the display device.

8. The learning device according to claim 5, wherein
the one or more hardware processors of the learning device are configured to further function as
an attention error evaluation unit configured to calculate the error evaluation value for the attention weight, based on the attention weight acquired and attention correct data that is generated in advance and represents a correct value of the attention weight corresponding to the target sentence, wherein
the parameter adjustment unit trains the attention unit based on the error evaluation value calculated for the attention weight.

9. The learning device according to claim 5, wherein
the one or more hardware processors of the learning device are configured to further function as
a control unit configured to perform controlling to train the neural network unit by the main learning unit or to adjust the parameters of the attention unit by the attention adjustment unit, wherein
the control unit causes the attention adjustment unit to adjust the parameters of the attention unit every time training of the neural network unit by the main learning unit satisfies a predetermined condition.

10. The learning device according to claim 9, wherein
the neural network unit executes, on the target document, the main task and a subtask that is different from the main task,
the neural network unit further comprises a subtask execution unit configured to execute the subtask based on the attention information estimated by the attention unit for each of the plurality of sentences,
the one or more hardware processors of the learning device are further function as a sub-learning unit that trains the neural network unit based on teacher data including the training document and correct data representing an execution result of the subtask execution unit, and
the control unit performs controlling to train the neural network unit by the main learning unit, to train the neural network unit by the sub-learning unit, or to adjust the parameters of the attention unit by the attention adjustment unit.

11. The learning device according to claim 10, wherein
the control unit
causes the training of the neural network unit by the main learning unit and the training of the neural network unit by the sub-learning unit to be alternately executed by switching between both trainings according to a predetermined condition, and
causes the attention adjustment unit to adjust the parameters of the attention unit every time the trainings of the neural network unit by the main learning unit and by the sub-learning unit satisfy a predetermined condition.

12. A document analysis method executed by an information processing device, the document analysis method comprising:

by the information processing device, extracting a plurality of sentences included in a target document;

by the information processing device, generating, for each of the plurality of sentences, initial element information representing an initial value of relevance to each of a plurality of predetermined attribute items; and by the information processing device, outputting an analysis of the target document using a neural network unit configured to receive sentence information representing content of an included text and the initial element information, and output a result of executing a main task on the target document, for each of the plurality of sentences, wherein the neural network unit comprises:
- an attention unit configured to receive the sentence information and the initial element information, calculate an attention weight representing an estimated value of relevance to each of the plurality of attribute items, and output attention information according to the attention weight, for each of the plurality of sentences; and
- a main task execution unit configured to execute the main task based on the attention information for each of the plurality of sentences.

13. A learning method for training a document analysis device by an information processing device, the document analysis device including one or more hardware processors configured to function as:
- a sentence extraction unit configured to extract a plurality of sentences included in a target document,
- an analysis unit configured to generate, for each of the plurality of sentences, initial element information representing an initial value of relevance to each of a plurality of predetermined attribute items, and
- a neural network unit configured to receive sentence information representing content of an included text and the initial element information, and output a result of executing a main task on the target document, for each of the plurality of sentences, the neural network unit including:
- an attention unit configured to receive the sentence information and the initial element information, calculate an attention weight representing an estimated value of relevance to each of the plurality of attribute items, and output attention information according to the attention weight, for each of the plurality of sentences, and
- a main task execution unit configured to execute the main task based on the attention information for each of the plurality of sentences, the learning method comprising:
- by the information processing device, training the neural network unit based on teacher data including a training document and correct data representing an execution result of the main task execution unit; and
- by the information processing device, adjusting a parameter included in the attention unit, wherein in the adjusting of the parameter, the learning method causes, by the information processing device, application of the initial element information and the sentence information corresponding to one target sentence in a plurality of sentences included in the training document, to the neural network unit, the learning method acquires, by the information processing device, the attention weight output from a normalization layer included in the attention unit, when the initial element information and the sentence information corresponding to the target sentence are applied to the neural network unit, and the learning method adjusts, by the information processing device, a plurality of parameters set to the attention unit, based on an error evaluation value for the attention weight.

* * * * *